United States Patent
Jiang et al.

(10) Patent No.: US 12,445,203 B2
(45) Date of Patent: Oct. 14, 2025

(54) APPARATUSES AND METHODS FOR GENERATING AN OPTICAL SIGNAL IN AN OPTICAL COMMUNICATION NETWORK

(71) Applicant: HUAWEI TECHNOLOGIES CO., LTD., Shenzhen (CN)

(72) Inventors: Zhiping Jiang, Kanata (CA); Yasser Chiniforooshan, Kanata (CA); Jiang Tang, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 252 days.

(21) Appl. No.: 18/296,958

(22) Filed: Apr. 6, 2023

(65) Prior Publication Data

US 2023/0246715 A1    Aug. 3, 2023

Related U.S. Application Data

(63) Continuation of application No. PCT/CN2020/119994, filed on Oct. 9, 2020.

(51) Int. Cl.
*H04B 10/04* (2006.01)
*H04B 10/50* (2013.01)
(Continued)

(52) U.S. Cl.
CPC ......... *H04B 10/503* (2013.01); *H04B 10/524* (2013.01); *H04B 10/071* (2013.01)

(58) Field of Classification Search
CPC .......... H04B 10/532; H04B 10/516; H04B 10/2569; H04B 10/0795; H04B 10/071;
(Continued)

(56) References Cited

U.S. PATENT DOCUMENTS

| 8,750,703 B2 * | 6/2014 | Effenberger ....... G01M 11/3136 398/31 |
| 2002/0003641 A1 * | 1/2002 | Hall ......................... H04J 14/06 398/65 |

(Continued)

FOREIGN PATENT DOCUMENTS

| CN | 1848554 A | 10/2006 |
| CN | 101271006 A | 9/2008 |
| CN | 109690976 A | 4/2019 |

OTHER PUBLICATIONS

S. H. Wang et al., "Polarization Independent Raman-Assisted Fiber Optical Parametric Amplifiers", 10th International Conference on Optical Communications and Networks (ICOCN 2011), Date of Conference: Nov. 5-Dec. 7, 2011, total: 2 pages.

*Primary Examiner* — Hanh Phan

(57) ABSTRACT

Apparatuses and methods are described for generating an optical signal in an optical network. The apparatus comprises at least a first and a second laser configured to generate a first or second series of optical pulses respectively and a polarization beam combiner (PBC). The PBC is configured to receive the first and second series of optical pulses. Each optical pulse in the first series of optical pulses is received with a first state of polarization (SOP), and each optical pulse in the second series of optical pulses is received with a second SOP. The first SOP and second SOP is orthogonal with respect to each other, and the PBC is further configured to combine the first and second series of optical pulses and to output an un-polarized optical signal. The un-polarized optical signal may help to reduce or mitigate nonlinear optical impairments caused by polarization of the optical signal.

16 Claims, 8 Drawing Sheets

(51) Int. Cl.
*H04B 10/524* (2013.01)
*H04B 10/071* (2013.01)

(58) Field of Classification Search
CPC .......... H04B 10/07955; H04B 10/0773; H04B 10/07953; H04B 10/0791; H04B 10/0771; H04B 10/073; H04B 10/503; H04J 14/06
USPC ....... 398/183, 184, 189, 192, 193, 194, 195, 398/196, 197, 198, 199, 16, 33, 38, 21, 398/22, 23, 24, 25, 26, 27, 30, 31, 32, 65, 398/152, 159, 10, 13, 17, 79, 158; 356/73.1
See application file for complete search history.

(56) References Cited

U.S. PATENT DOCUMENTS

| | | | |
|---|---|---|---|
| 2011/0149271 A1 | 6/2011 | Woodward et al. | |
| 2012/0224862 A1* | 9/2012 | Liu | H04B 10/5161 398/152 |
| 2017/0359127 A1* | 12/2017 | Moeller | H04J 14/06 |
| 2020/0036447 A1* | 1/2020 | Ait Sab | H04B 10/29 |
| 2020/0110003 A1 | 4/2020 | Schrenk | |

* cited by examiner

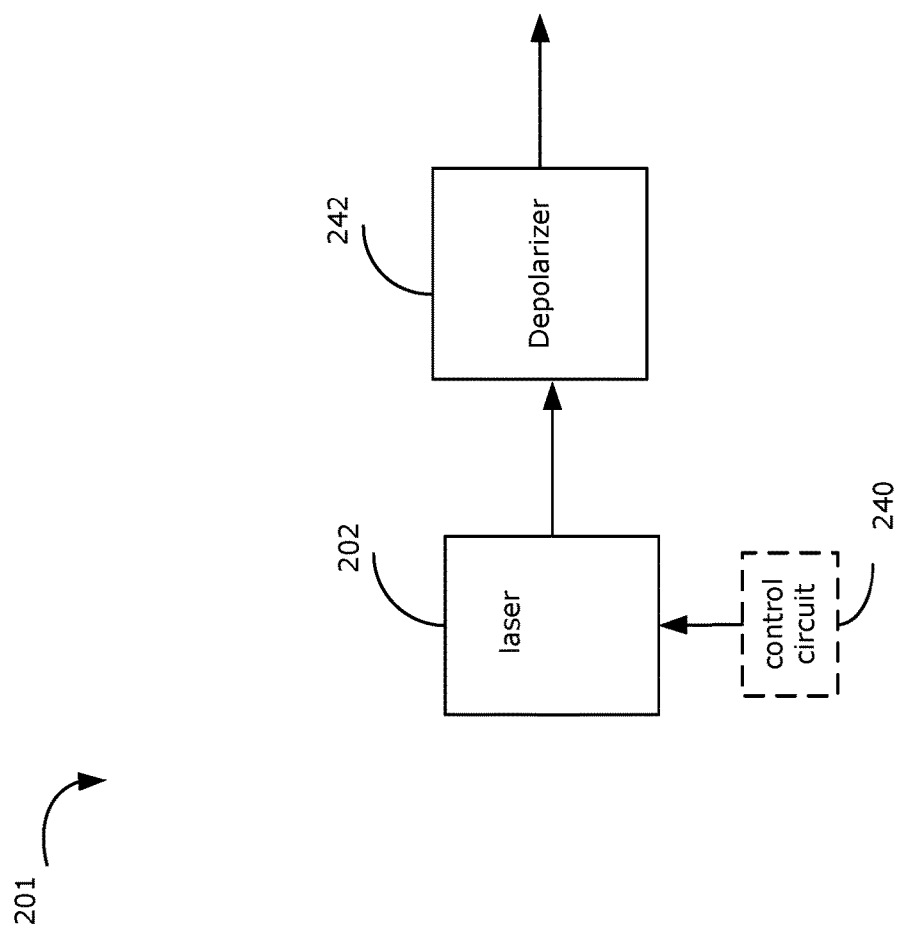

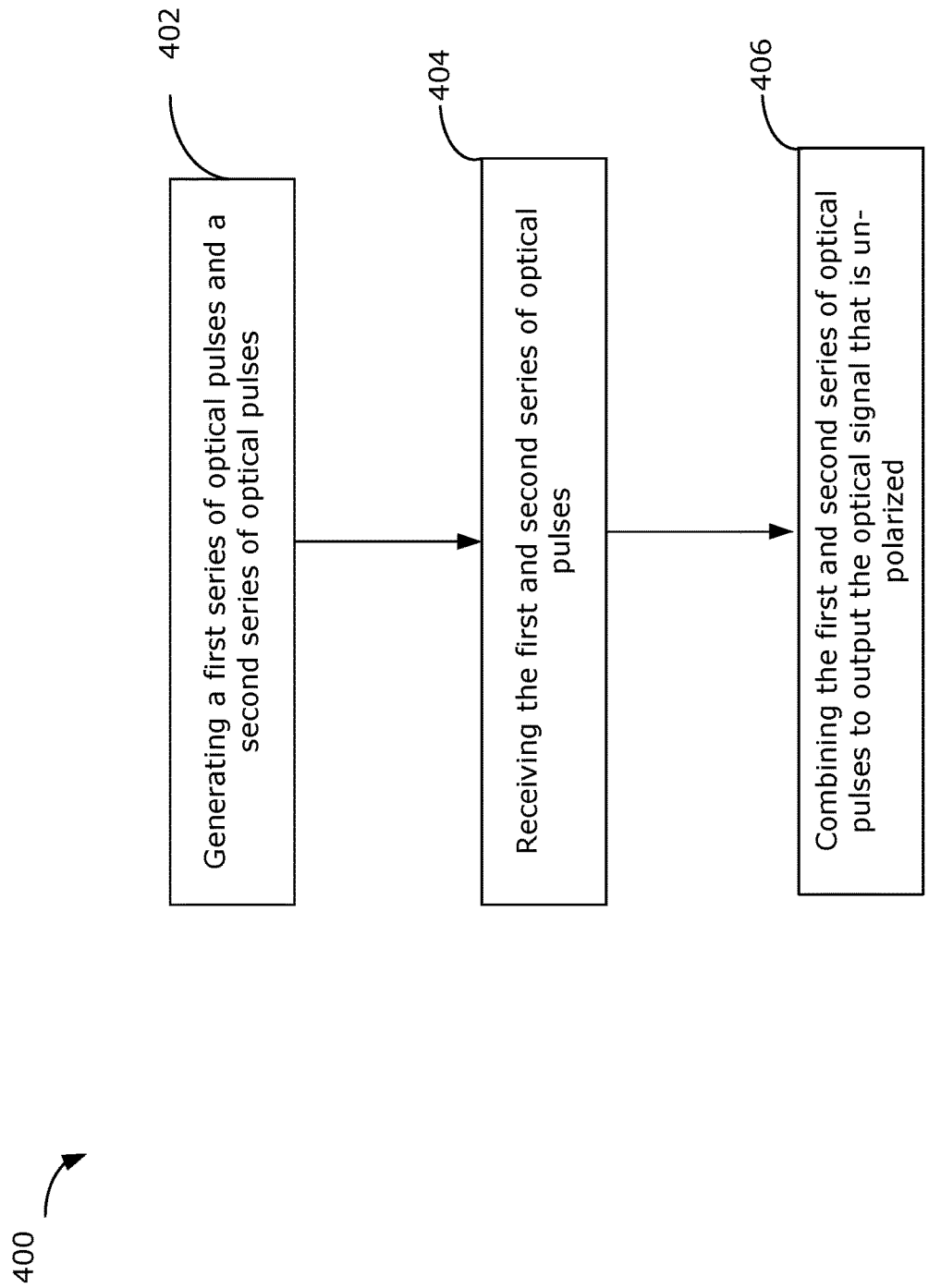

APPARATUSES AND METHODS FOR GENERATING AN OPTICAL SIGNAL IN AN OPTICAL COMMUNICATION NETWORK

CROSS-REFERENCE TO RELATED APPLICATIONS

The present disclosure is a continuation application of International Application No. PCT/CN2020/119994, entitled "APPARATUSES AND METHODS FOR GENERATING AN OPTICAL SIGNAL IN AN OPTICAL COMMUNICATION NETWORK", filed Oct. 9, 2020, the entirety of which is hereby incorporated by reference.

TECHNICAL FIELD

The present application relates to optical communication networks, and in particular to apparatuses and methods for mitigating nonlinear impairments in optical systems.

BACKGROUND

In optical communication networks, an optical time-domain reflectometer (OTDR) is an optical test instrument used to detect optical return loss of an optical fiber that is under testing or monitoring (also referred to as a monitored optical fiber). The OTDR transmits an optical signal including a series of optical pulses into the monitored optical fiber and detects a reflected signal due to scattering (e.g., due to Rayleigh backscattering) and/or reflection back along the monitored optical fiber. The reflected signal that is detected is used to characterize the monitored optical fiber. In some applications, the OTDR is an optical equivalent of an electronic time-domain reflectometer that measures reflections caused by changes in the impedance of an electrical cable under test. The strength of the reflected signal is measured as a function of time, and plotted as a function of the length of the monitored optical fiber or the electrical cable under test.

Thus, an OTDR with greater accuracy, measurement range, and instrument resolution is in high demand in testing and troubling shooting solutions in optical communication networks. For example, the dynamic range of the OTDR is an important parameter for evaluating the performance of the OTDR. The dynamic range is defined as the difference between the initial strength of the reflected signal (at the near end of the optical fiber being tested) and a detection noise floor (which is a sum of all the noise sources and unwanted signals). The maximum length of optical fiber that can be monitored is dependent on the dynamic range of the OTDR. In order to increase the dynamic range of the OTDR, the OTDR may generate a series of optical pulses with high power. However, using a series of optical pulses with high power may introduce different kinds of impairments to an optical signal carrying payload data that is transmitted on the monitored fiber. Introduced impairments may be nonlinear optical effects, including cross-phase modulation (XPM) and cross-polarization modulation (XPolM), which highly depend on the state of polarization (SOP) of the series of optical pulses. Such impairments degrade the performance of other optical signals carrying payload data along the optical fiber.

Some conventional methods are used to reduce the nonlinear optical effects to other optical signals transmitted on the monitored fiber. For example, one known technique is to control the power of each optical pulse generated from the OTDR to have a lower power, which may result in a smaller dynamic range of the OTDR. Another conventional method uses the OTDR in an off-line manner (e.g., by disconnecting components of an optical communication network to be tested), which may interrupt services that are being provided by the optical communication network.

Thus, it is desirable to provide an optical apparatus to detect performance of an optical communication network (e.g., including a optical fiber or optical fiber links that need to be tested, measured, or certified), while reducing nonlinear optical impairments on other optical signals carrying payload data in the optical communication network and without interrupting services provided by the optical communication network.

SUMMARY

The present disclosure provides apparatuses and methods for generating an un-polarised optical signal. In some embodiments, the un-polarised optical signal is generated by combining a first and second series of optical pulses. Each optical pulse in the first series of optical pulses has a first SOP that is orthogonal with respect to a second SOP of each optical pulse in the second series of optical pulses. As the generated optical signal includes dual polarizations (e.g., first and second SOP that are orthogonal), the generated optical signal behaves like an un-polarised signal.

According to some example aspects, the present disclosure describes an apparatus in an optical network. The apparatus comprises at least a first and a second laser and a polarization beam combiner (PBC). The first laser is configured to generate a first series of optical pulses, and the second laser is configured to generate a second series of optical pulses. The PBC is configured to receive the first and second series of optical pulses. Each optical pulse in the first series of optical pulses is received with a first state of polarization (SOP), and each optical pulse in the second series of optical pulses is received with a second SOP. The first SOP and second SOP is orthogonal with respect to each other, and the PBC is further configured to combine the first and second series of optical pulses and to output an un-polarized optical signal.

In any of the preceding aspects/embodiments, a first frequency of the first series of optical pulses generated from the first laser has a frequency offset relative to a second frequency of the second series of optical pulses generated from the second laser.

In any of the preceding aspects/embodiments, each optical pulse in at least one of the first and second series of optical pulses has a respective rising edge and a respective falling edge. The first laser is configured to, for the optical pulse in the first series of optical pulses, adjust at least one of a rising slope time on the respective rising edge or a falling slope time on the respective falling edge to be greater than zero. The second laser is configured to, for the optical pulse in the second series of optical pulses, adjust at least one of a rising slope time on the respective rising edge or a falling slope time on the respective falling edge to be greater than zero.

In any of the preceding aspects/embodiments, the apparatus further comprises at least a first and a second optical fiber. The first optical fiber couples the first laser to the PBC, and the second optical fiber couples the second laser to the PBC. The first optical fiber is disposed such that first optical fiber has a first orientation that is physically rotated 90° with respect to a second orientation of the second optical fiber, such that the first SOP of each of the first series of optical pulses received at the PBC is orthogonal to the second SOP of each of the second series of optical pulses received at the PBC.

In any of the preceding aspects/embodiments, each optical pulse in the first series of optical pulses has at least one of a power, a pulse shape, or a timing equal to each optical pulse in the second series of optical pulses.

In any of the preceding aspects/embodiments, the apparatus further comprises an optical circulator that is configured to transmit the un-polarized optical signal into a monitored optical fiber.

In any of the preceding aspects/embodiments, the apparatus further comprises a photodetector (PD) that is configured to receive a reflected signal that is scattered back along the monitored optical fiber and to measure a power and a time delay of the reflected signal.

In any of the preceding aspects/embodiments, the apparatus includes an optical time-domain reflectometer (OTDR).

In any of the preceding aspects/embodiments, each of the first and second SOPs includes a linear polarization.

According to some example aspects, the present disclosure describes a method for generating an optical signal in an optical network. The method comprises generating a first series of optical pulses and a second series of optical pulses; receiving the first and second series of optical pulses, each optical pulse in the first series of optical pulses being received with a first state of polarization (SOP), and each optical pulse in the second series of optical pulses being received with a second SOP, the first SOP and the second SOP being orthogonal with respect to each other; and combining the first and second series of optical pulses to output the optical signal that is un-polarized.

In any of the preceding aspects/embodiments, a first frequency of the first series of optical pulses generated from the first laser has a frequency offset relative to a second frequency of the second series of optical pulses generated from the second laser.

In any of the preceding aspects/embodiments, each optical pulse in at least one of the first and second series of optical pulses has a respective rising edge and a respective falling edge. The method further comprises adjusting at least one of a rising slope time on the respective rising edge or a falling slope time on the respective falling edge to be greater than zero.

In any of the preceding aspects/embodiments, the first series of optical pulses are carried on a first optical fiber that is disposed such that the first optical fiber has a first orientation that is physically rotated 90° with respect to a second orientation of the second optical fiber, such that the first SOP of each of the first series of optical pulses is orthogonal to the second SOP of each of the second series of optical. In any of the preceding aspects/embodiments, each optical pulse in the first series of optical pulses has at least one of a power, a pulse shape, or a timing equal to each optical pulse in the second series of optical pulses.

In any of the preceding aspects/embodiments, the method further comprises transmitting the optical signal into a monitored optical fiber.

In any of the preceding aspects/embodiments, the method further comprises receiving a reflected signal that is scattered back along the monitored optical fiber; and measuring a power and a time delay of the reflected signal.

In any of the preceding aspects/embodiments, each of the first and second SOPs includes a linear polarization.

In any of the preceding aspects/embodiments, the method is implemented on an optical time-domain reflectometer (OTDR). Each of the variations or alternatives, along with some potential benefits, will be discussed in more detail below.

BRIEF DESCRIPTION OF THE DRAWINGS

Reference will now be made, by way of example, to the accompanying figures which show example embodiments of the present application, and in which:

FIG. 2D illustrates an example optical signal generator of the apparatus of FIG. 2A in accordance with alternative example embodiments;

FIG. 4 is a flowchart illustrating an example method for generating an optical signal that may be carried out by the apparatus of FIG. 2A or the optical signal generators of FIG. 2B, according to example embodiments.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure provides an apparatus and a method for generating an optical signal that is used to characterize (reflect or represent the physical characteristics of) a monitored optical communication network. In some embodiments, the apparatus includes at least a first and second laser and a polarization beam combiner (PBC), to generate an un-polarized optical signal. The apparatus may be used in an OTDR. As discussed in more detail below, a polarized signal is one in which the signal, modeled as a wave, constrains the waves to a particular direction. A signal may be deemed polarized, even it is not perfectly polarized, if it behaves in practice like a polarized signal. Similarly, a signal may be deemed un-polarised if it effectively behaves in practice like an un-polarised signal.

In some examples, the un-polarized optical signal is generated by combining a first series of optical pulses generated from the first laser and a second series of optical pulses generated from the second laser. Each of the first series of optical pulses has a first state of polarization (SOP), and each of the second series of optical pulses has a second SOP. The first SOP and second SOP are orthogonal with respect to each other. The orthogonality need not be perfect. SOP, though representing a physical phenomenon, may be modeled mathematically, e.g., as a vector. In some applications, each optical pulse in the first series of optical pulses has at least one of a power, a pulse shape, or a timing approximately equal to each optical pulse in the second series of optical pulses. As the generated optical signal with dual polarizations (e.g., each first SOP is orthogonal with respect to each second SOP) effectively behaves like an un-polarized signal, the nonlinear optical effects (e.g., XPM or XPolM) that closely depend on polarization of the generated optical signal may be eliminated or reduced significantly. Therefore, when the monitored optical communication network is under characterization or trouble shooting, other concurrent optical signals carrying payload data in the monitored optical communication network may be unaffected by the testing, and services provided by the monitored optical communication network is prevented from being interrupted.

Figure 1A:
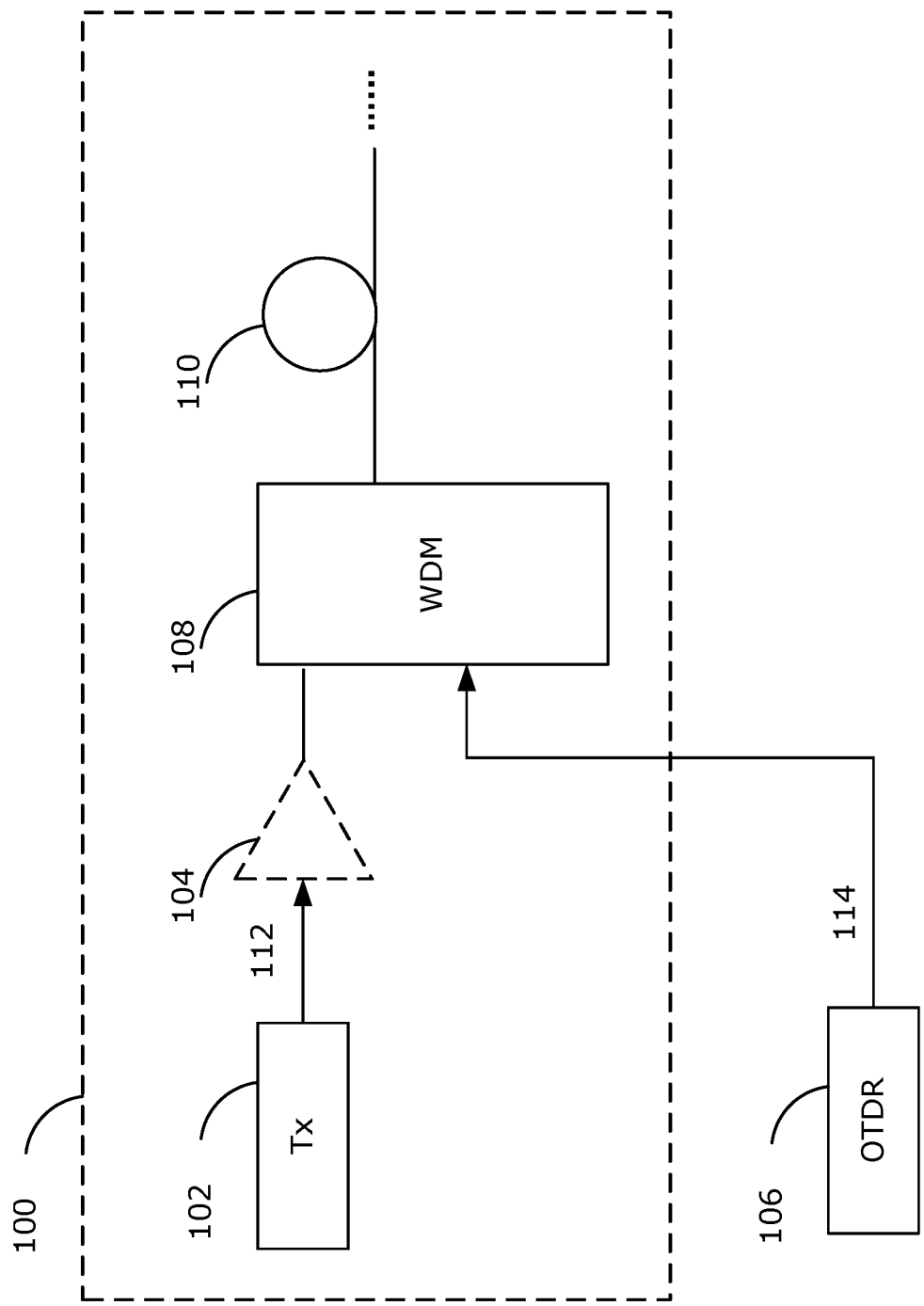
FIG. 1A illustrates how a conventional OTDR is used to characterize a monitored optical communication network.

FIG. 1A illustrates an example setup using a conventional OTDR that tests or diagnoses an example monitored optical communication network 100 that provides varieties of services to users. In the example of FIG. 1A, the monitored optical communication network 100 includes at least one transmitter (Tx) 102, an optional amplifier 104, a wavelength-division-multiplexer (WDM) 108, an optical fiber 110, and other possible components that are not shown for simplicity. The transmitter 102 generates at least a first optical signal 112 that carries payload data. The optional amplifier 104 amplifies the first optical signal(s) 112 and then generates at least one amplified signal. The amplified signal(s) is then multiplexed onto the optical fiber 110 by the WDM 108.

Figure 1B:
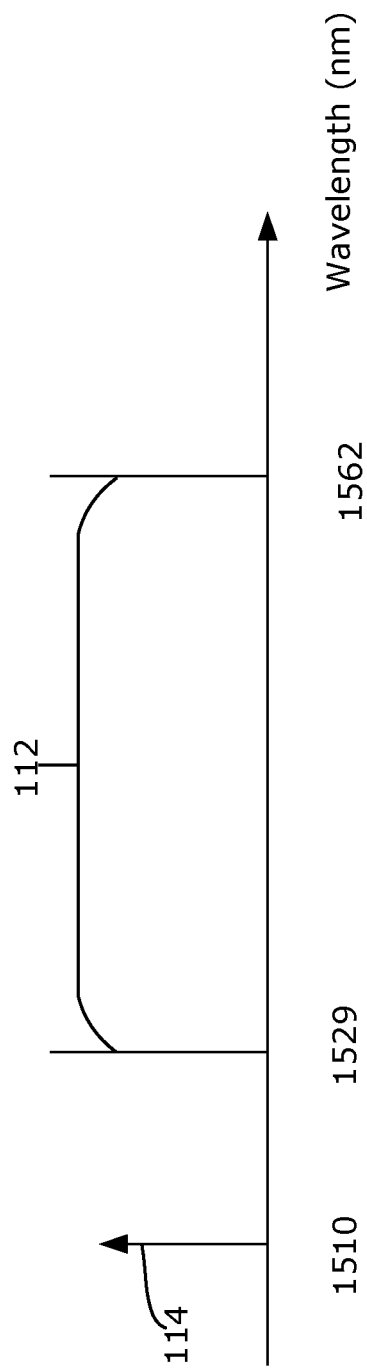
FIG. 1B shows a wavelength of an optical signal generated by the conventional OTDR of FIG. 1A and a wavelength range occupied by an optical signal generated by the monitored optical communication network of FIG. 1A.

When the optical communication network 100 needs to be monitored or diagnosed, a conventional OTDR 106 can be used to test links or nodes of the optical communication network 100 without interrupting the services that are being provided to the users (e.g., without disconnecting links or nodes of the optical communication network 100) if the wavelength of a second optical signal generated by the conventional OTDR 106 is out-of-band (OOB). For example, each of the first optical signal(s) 112 may have a typical C band, including a wavelength range from 1529 nanometer (nm) to 1562 nm, as shown in FIG. 1B. If the optical communication network 100 needs to be tested or diagnosed without services being interrupted, a wavelength of the second optical signal 114 has to be different than or outside of the wavelength range (e.g., 1529-1562 nm) of the first optical signal(s) 112. In the example of FIG. 1B, the wavelength of the second optical signal 114 is around 1510 nm, which falls outside the wavelength range 1529-1562 nm occupied by the first optical signal(s) 112.

Although the optical communication network 100 as shown in FIG. 1A provides an example optical communication environment, this is only illustrative and is not intended to be limiting. In other examples, the optical commutation network 100 can be any other optical communication network and may include other components, for example the OTDR 106, more than one amplifier 104, a plurality of optical fibers 110, and/or more than one WDM 108.

While an OTDR performs diagnosis or characterization of a monitored optical communication network, various requirements should be met to ensure greater performance of the OTDR and/or to reduce impact on transmission of the payload-carrying optical signal 112. For example, the dynamic range is an important factor to evaluate the performance of the OTDR. When the OTDR tests an optical fiber over a long distance, the power of a signal that is reflected from the far end of the optical fiber may be too low to be distinguishable from noise. Therefore, in order to ensure that the OTDR can be used to perform diagnosis or monitoring of an optical fiber over a longer distance (i.e., larger dynamic range), the power of the second optical signal 114 generated by the OTDR may be increased significantly. However, due to Kerr nonlinear interferences between neighboring channels, the second optical signal 114 may cause transient nonlinear phase changes to the first optical signal 112 by introducing different kinds of nonlinear optical impairments (e.g., XPM, or XPolM) that closely depend on polarization of the second optical signal 114. In particular, the higher the power of the second optical signal 114, the severer the nonlinear optical impairments.

What is more, when the nonlinear phase changes have been introduced to the first optical signal 112 (such as a quadrature amplitude modulated signal) at a transmitter, a phase recovery algorithm and/or polarization recovery algorithm may be applied at a receiver in the optical communication network 100 to track those nonlinear phase changes. However, there can be many residual phase errors that occur at rising and/or falling edges of each recovered optical signal, and rates of the nonlinear phase changes may be too fast for performing the tracking. Thus, different kinds of errors may be introduced when the payload data is recovered at the receiver, which may result in higher bit error ratio (BER).

As such, an apparatus and a method disclosed herein are used to diagnose, characterize, and/or perform troubling-shooting of a monitored optical communication network, without requiring the monitored optical communication network to be off-line (e.g., disconnecting the monitored optical communication network to interrupt services). The apparatus may help to reduce or eliminate nonlinear optical impairments caused by polarization of optical signals generated by the apparatus, and may also have a sufficiently large dynamic range.

Figure 2A:
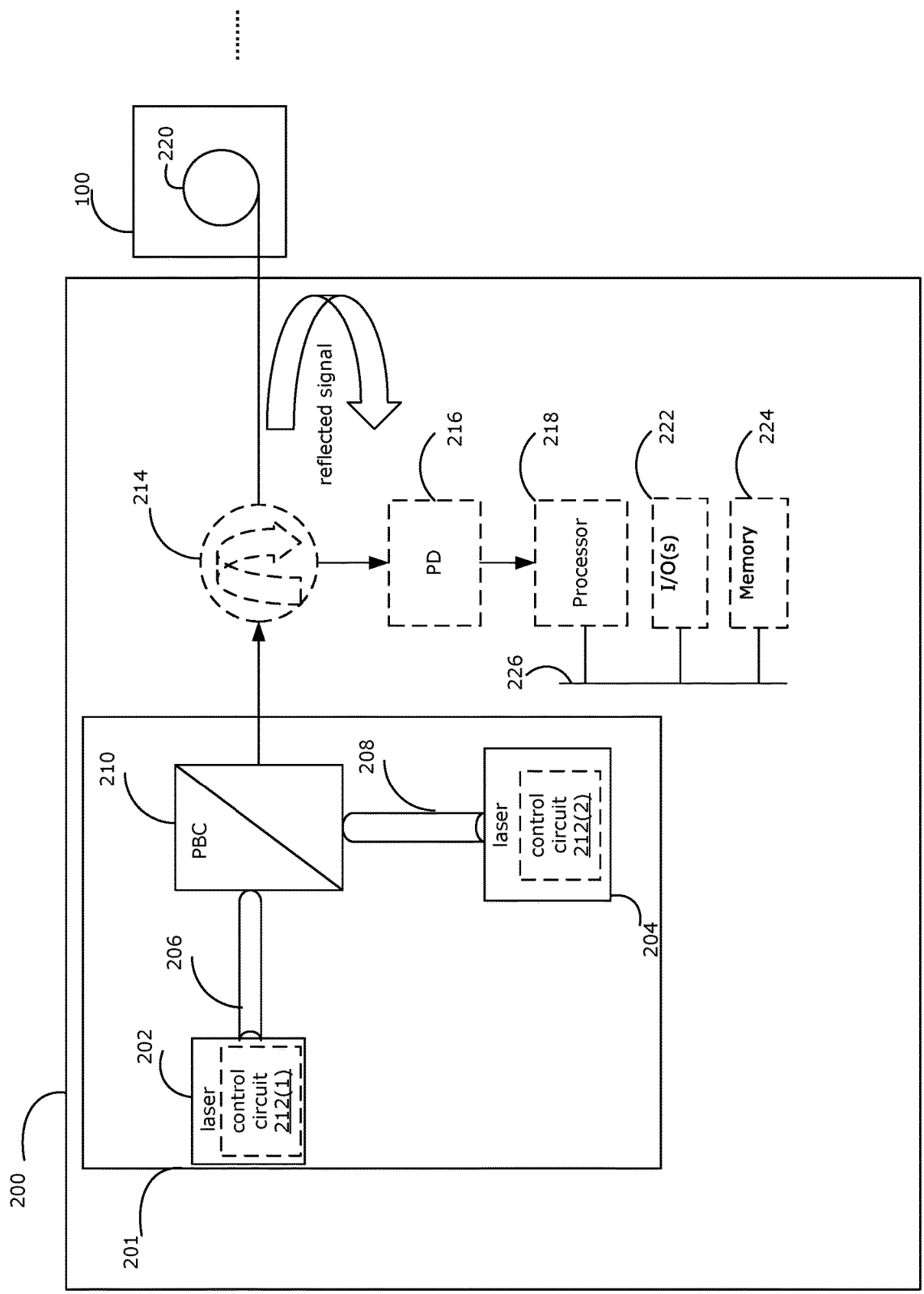
FIG. 2A illustrates an example apparatus that is used to characterize an monitored optical communication network in accordance with example embodiments.

FIG. 2A illustrates a block diagram of an example apparatus 200 which may be used to diagnose, characterize, and/or perform troubling shooting of the monitored optical communication network 100 of FIG. 1A, in accordance with example embodiments disclosed herein. The apparatus 200 includes at least one optical signal generator 201. The optical signal generator 201 includes at least a first and a second laser 202, 204 and a polarization beam combiner (PBC) 210. The first laser 202 generates a first series of optical pulses, and the second laser 204 generates a second series of optical pulses. Each optical pulse in the first series of optical pulses has at least one of power, pulse shape, or timing approximately equal to each optical pulse in the second series of optical pulses. In some examples, the power may be within around 1 dB. The first laser 202 is coupled to the PBC 210 via a first optical fiber 206, and a second optical fiber 208 couples the second laser 204 to the PBC 210. The PBC then combines the first and second series of optical pulses produced by the first and second laser 202, 204 respectively to generate a combined optical signal, with dual polarizations. The optical signal generated from the optical signal generator 201 is thus an un-polarized optical signal.

In particular, each pulse of the first series of optical pulses received by the PBC 210 has a first SOP, and each pulse of the second series of optical pulses received by the PCB 210 has a second SOP. The first SOP and second SOP are orthogonal with respect to each other. In some examples, each of the first and second SOPs includes a linear polarization (in which the optical pulses are substantially planar along a direction of propagation). As the first SOP and second SOP are oriented to be orthogonal with respect to each other, the combined optical signal outputted by the PBC 210 includes two orthogonal polarizations and effectively behaves like an un-polarized optical signal. Accordingly, nonlinear polarization-dependent optical impairments caused by the optical signal generated by the PBC 210 may be eliminated or mitigated significantly, because the optical signal generated by the PBC 210 behaves like an un-polarized optical signal. Therefore, while the apparatus 200 is used to diagnose a monitored optical communication network that is in operation or online, the dynamic range of the apparatus 200 can be increased to monitor longer optical fibers or links of the monitored optical communication network without severe nonlinear optical impairments.

In some examples, the apparatus 200 may be an OTDR, which may further comprise an optical circulator or an optical coupler 214, a photodetector (PD) 216, and a processor 218. The un-polarized optical signal generated from the PBC 210 is coupled to subsequent optical fibers by the optical circulator 214 to test, track, or perform trouble shooting on a monitored optical communication network 100, for example to monitor or diagnose one or more monitored optical fibers/links 220 of the optical communication network 100. The PD 216 detects one or more reflected signals that is scattered (e.g., Rayleigh backscattered) or reflected back by the monitored optical fiber 220. The processor 218 is coupled to the PD 216 to receive data from the PD 216 representing the detected reflected optical signals. Intensity (e.g., power) and elapsed time (e.g., time delay) of the reflected optical signals are measured and processed by the processor 218. The processor 218 may be further coupled to a display (not shown) for outputting the measurements. For example, the processor 218 may calculate the time delay and map or convert the calculated time delay into a length of the monitored optical fiber 220 based on known light speed in the fiber. In some examples, as the reflected signal is weak, the measurement may be repeated multiple times by using a series of optical pulses in the un-polarized signal generated by the PBC 210, rather than a single optical pulse.

Figure 3:
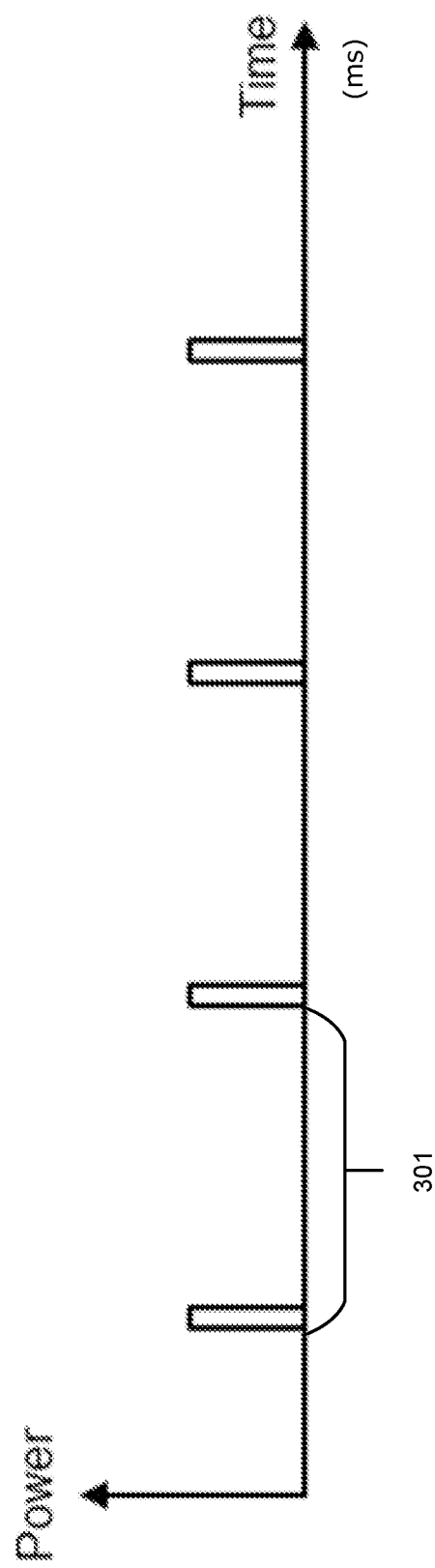
FIG. 3 presents a plot of a series of pluses included in an optical signal generated by the optical signal generators of FIG. 2B in accordance with example embodiments.

FIG. 3 shows a plot of optical pulses of the un-polarized signal that is generated by the PBC 210. In some examples, a time interval 301 between two consecutive optical pulses may be longer than a round trip time (RTT) that is required for one optical pulse to travel the full length of the monitored optical fiber 220 and return to the PD 216. A unit of the time interval 301 may be millisecond. For example, a RTT for an optical fiber 100 kilometres (km) long is about 1 ms. Thus, the time interval 301 may be longer than 1 ms.

As mentioned above, optical pulses that are transmitted on the optical fiber for monitoring purposes may cause undesirable nonlinear phase changes (e.g., XPM effects) as well in a payload-carrying optical signal being concurrently carried on the same optical fiber. When recovering the payload-carry optical signal at a receiver (e.g., coherent receiver), the undesirable nonlinear phase changes may be tracked at the receiver in order to ensure the process of recovering to be more accurate. However, when the undesirable nonlinear phase changes are being tracked, residual phase errors (resulting in higher BER) may occur at rising and/or falling edges on each optical pulse of a recovered optical signal because rates of the undesirable nonlinear phase changes are too fast to be tracked. Thus, it may be useful to slow the rates of the undesirable nonlinear phase changes caused by the optical pulses generated from the apparatus 200. Doing so may help to eliminate or mitigate XPM effects (in addition to mitigation of XPolM effects by using an un-polarized optical signal as discussed above).

Referring to FIG. 2A again, in some possible configurations, each of the first and second laser 202, 204 may further include a respective one of a first or second control circuit 212(1) or 212(2) (generically referred to as a control circuit 212) that adjusts (e.g., slows down) the rising edges and/or falling edges of a respective optical pulse. For example, for each of the first and second series of the optical pulses, in order to ensure each optical pulse to have non-zero rising slope time and/or falling slope time, the first control circuit 212(1) or the second control circuit 212(2) adjusts at least one of a rising slope time on the rising edge or a falling slope time on the falling edge of the corresponding optical pulse to be greater than zero (e.g., greater than 0 second, 0 nanosecond, . . . etc.). In particular, the control circuit 212 may adjust the rising slope time and/or falling slope time to be sufficiently slow to help enable better tracking at the receiver. Therefore, the rates of the nonlinear phase changes caused by the optical pulses generated from the apparatus 200 may be reduced, which may in turn help to reduce or mitigate the residual phase errors in recovering the optical signal at the receiver. Accordingly, the BER may be reduced. In this example, the first and second control circuits 212(1), 212(2) may be used to control internal settings (e.g., hardware, software implementation (e.g., digital control of signal), or a combination of hardware and software implementations) of a respective laser 202, 204. In other possible configurations, the first and second control circuits 212(1), 212(2) may be components that are external to the first and second laser 202, 204 within the apparatus 200.

In some examples, if the first and second series of optical pulses are at slightly different but close frequencies (e.g., differ by a few Hz), beating can occur between the first and second series of optical pulses (beating may make it difficult to distinguish optical pulses). Therefore, a first frequency of the first series of optical pulses may have an intentionally introduced frequency offset relative to a second frequency of the second series of optical pulses, in order to separate the first and second frequencies to avoid the beating. The intentionally introduced frequency offset should be sufficient (e.g., at least a few GHz, such as 10 GHz) to avoid the beating phenomenon. This may help to reduce the nonlinear optical impairments further.

Figure 2B:
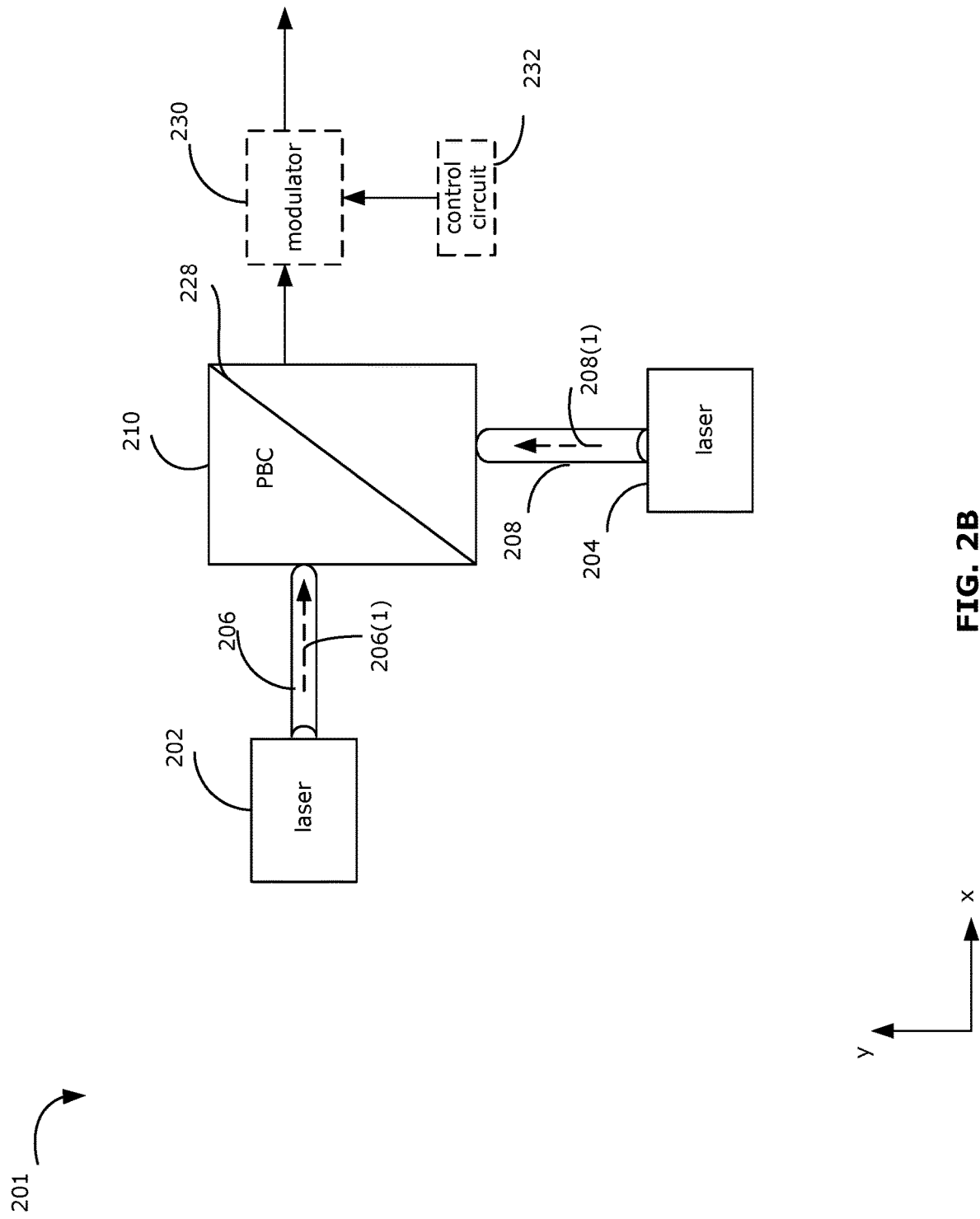
FIG. 2B illustrates an example optical signal generator of the apparatus of FIG. 2A in accordance with example embodiments.

FIG. 2B presents an example optical signal generator 201, which enables the first SOP of the first series of pulses and the second SOP of the second series of pulses that are received at the PBC 210 to be orthogonal with respect to each other. In some examples, the PBC 210 includes two input ports each receiving a respective series of optical pulses from a respective laser 202, 204, via a respective optical fiber 206, 208. The PBC 210 may be configured to (arranged or otherwise set up to be able to) combine two optical signals having two orthogonal polarizations. At each input port, only one polarization of the received signal is passed through to be combined at an optical interface 228. As shown in FIG. 2B, the first series of optical pulses are generated by the first laser 202 and received at the PBC 210 via the first optical fiber 206. The first optical fiber 206 may be rotated about its main axis 206(1) such that the first series of optical pulses are linearly polarized in one polarization (e.g., having X polarization) when the first series of pulses are received by the PCB 210. Similarly, the second series of optical pulses are generated by the second laser 204 and received at the PBC 210 via the second optical fiber 208. The second optical fiber 208 may be rotated about its main axis 208(1) such that the second series of optical pulses are linearly polarized in a second orthogonal polarization (e.g., having Y polarization) when the second series of pulses are received by the PCB 210. Thus, the first optical fiber is disposed to have a first orientation, and the second optical fiber is disposed to have a second orientation, where the first orientation of the first optical fiber 206 is physically rotated 90° with respect to the second orientation of the second optical fiber 208. Accordingly, the SOP of the first series of optical pulses and the SOP of the second series of optical pulses are orthogonal with respect to each other when received by the PCB 210. The first and second series of optical pulses can then pass through the PBC 210 and are combined by the PBC 210 at the optical interface 228. The output of the PBC 210 is the un-polarized optical signal that is the result of this combination. Such physical rotation (e.g., 90° relative rotation) of the first and second optical fibers may help to enable the first and second series of optical pulses have SOPs orthogonal with respect to each other, when received at the PBC 210, without introducing extra hardware cost.

FIG. 2B is an illustrative example that utilizes physical rotations of fibers 206, 208 to enable the combined optical signal generated from the PBC 210 to have dual orthogonal polarizations. However, these examples are not intended to be limiting. In other examples, any other possible configuration in the optical signal generator 201 may be applied to cause the PCB 210 to receive the first and second series of pulses having orthogonal SOPs with respect to each other, such that the combined optical signal generated from the PBC 210 is an un-polarised signal, with dual orthogonal polarizations. For example, other embodiments may introduce additional optical components (e.g., polarizing optical filters) into the optical signal generator 201.

In some possible configurations, for example, as shown in FIG. 2B, the optical signal generator 201 may further include a modulator 230. The modulator 230 may be an electro-absorption modulator (EAM), which can be used to modulate an intensity (e.g., power) of each pulse generated from the PBC 210 by applying an electric voltage. The modulator 230 and the electric voltage may be controlled by a control circuit 232. As the modulator 230 is a polarization-insensitive modulator, the dual orthogonal polarizations of the un-polarised signal generated from the PBC 210 will not be affected by the modulation.

Figure 2C:
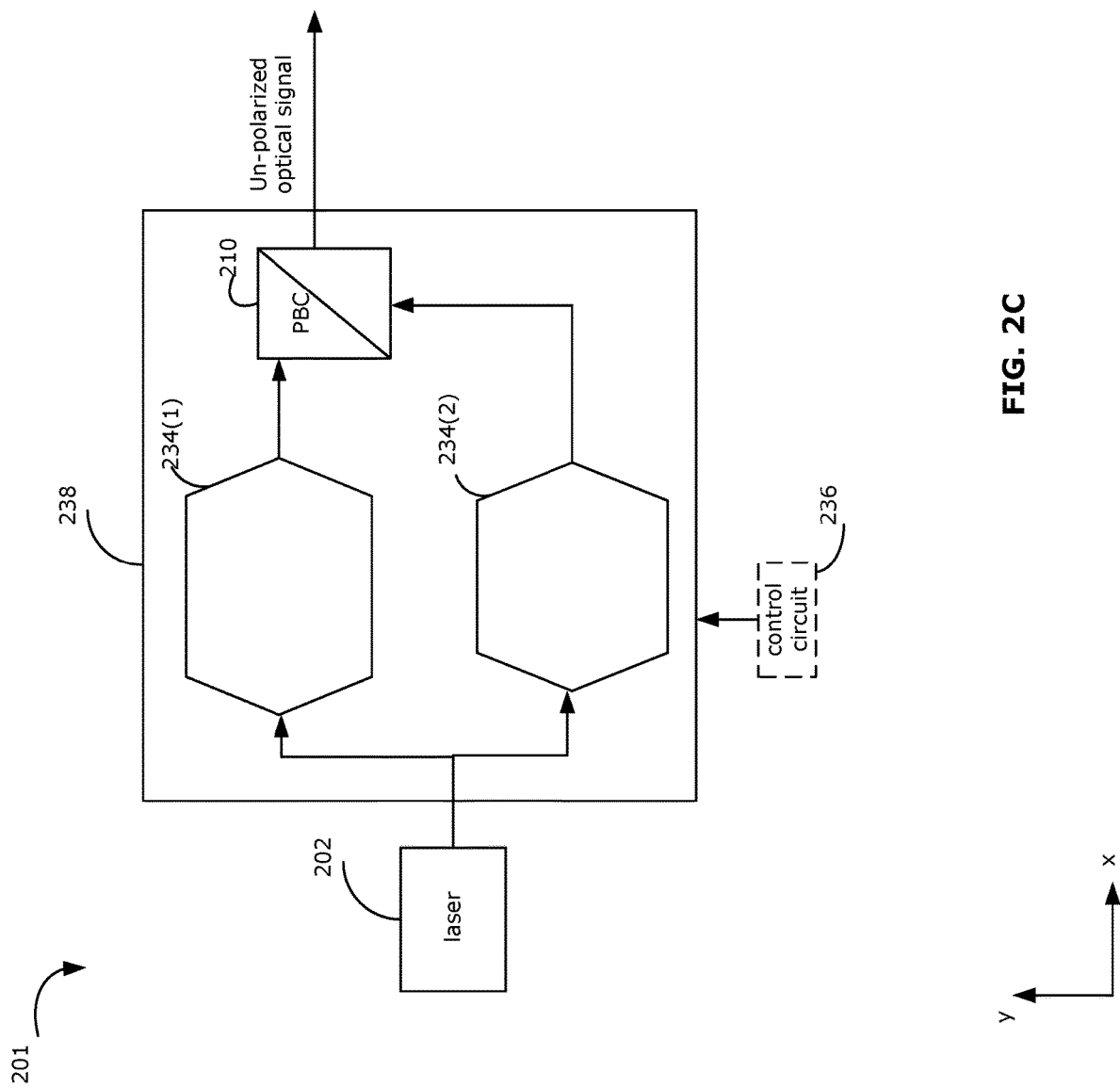
FIG. 2C illustrates an example optical signal generator of the apparatus of FIG. 2A in accordance with alternative example embodiments.

FIG. 2C shows an alternative example optical signal generator 201, which generates an un-polarized signal including two SOPs orthogonal with respect to each other. In this example, the optical signal generator 201 comprises a laser 202 and a Dual Polarization Mach Zenhder Modulator (DPMZM) 238. As shown in FIG. 2C, the DPMZM 238 comprises first and second Mach Zenhder Modulators (MZMs) 234(1), 234(2) (generically referred to as MZM 234) and a PBC 210. Compared to the example of FIG. 2B, although one single laser 202 is used in the example of FIG. 2C, the two MZMs 234(1), 234(2) can perform modulation and polarization adjustments or rotations on respective received series of optical pulses and enable the PBC 210 to receive two series of optical pulses that have SOPs that are orthogonal with respect to each other. For examples, a series of optical pulses generated by the laser 202 is split into two channels where a first and second split series of optical pulses are respectively transmitted. The first MZM 234(1) is controlled (e.g., by a control circuit 236) to adjust the first split series of optical pulses to align along one linear polarization (e.g., having X polarization), and the second MZM 234(2) is configured to control the second split series of optical pulses to have a polarization (e.g., Y polarization) orthogonal to the first series. As the two series of optical pulses received by the PBC 210 are adjusted to have orthogonal SOPs, and an optical signal generated by the PCB 210 includes the dual orthogonal SOPs, the generated optical signal is un-polarized. In some examples, at least one of the first MZM 234(1) and the second MZM 234(2) may further be controlled to introduce a frequency offset between the first and second split series of optical pulses such that the orthogonality of SOPs can be achieved for the combined optical signal generated by the PCB 210.

As such, even though a single laser 202 is applied in the optical signal generator 201, the DPMZM 238 can be used in the optical signal generator 201 to enable the optical pulses combined at two input ports of the PBC 210 to be at orthogonal polarizations with respect to each other, in order to generate an un-polarized optical signal. As presented in FIG. 2C, the modulation and/polarization performed at the DPMZM 238 may be controlled by the control circuit 236.

In some examples, for each optical pulses with a respective polarization (e.g., X or Y polarization), at least one of a rising slope time on the respective rising edge or a falling slope time on the respective falling edge may be controlled or adjusted by the control circuit 236 to be greater than zero, in order to mitigate non-linear impairments (e.g., XPM) further.

Referring to FIG. 2D now, which illustrates another optical signal generator 201 in accordance with alternative embodiments. The optical signal generator 201 includes a laser 202 and a depolarizer 242. The depolarizer 242 is an optical device used to scramble the polarizations of optical pulses. In some examples, the depolarizer 242 may output randomly polarized light whatever its input or produce pseudo-random output polarization. That is, although the laser 202 may generate a series of optical pulses all having the same SOP, the depolarizer 242 receives the series of optical pulses and scrambles the SOP of the received optical pulses to generate an un-polarized signal having randomly changing polarizations. It should be noted that, in some examples, the series of optical pulses generated by the laser 202 may include SOPs having linear polarization or circular polarization. In the example of FIG. 2D, with respect to mitigating non-linear impairments (e.g., XPM), for each optical pulse generated by the laser 202, the optical signal generator 201 may further include a control circuit 240 to control at least one of a rising slope time on the respective rising edge or a falling slope time on the respective falling edge to be greater than zero. In some other examples, the control circuit 240 may be an internal setting of the laser 202 to adjust the rising and/or falling edges.

It is noted that although the optical signal generators 201 illustrated in FIGS. 2B-2D have different configurations, the optical signal generated by each optical signal generator 201 is an un-polarized signal (e.g., by combining pulses having two orthogonal SOPs, or by randomizing the SOPs of pulses). Therefore, nonlinear optical impairments (XPolM and/or XPM) caused by polarization of the generated optical signal may be reduced significantly. It should be understood that the optical signal generator 201 may have any of the above-described configurations, and variations thereof, to enable the optical signal generator 201 to output an un-polarized optical signal. Other embodiments of the optical signal generator 201 may be used, within the scope of the present disclosure, to output an un-polarized optical signal.

Furthermore, the control circuits 232, 236, and 240 demonstrated as respective components external to the modulator 230, the DPMZM 238, and the laser 202 are illustrative and are not intended for limiting. In other possible applications, the control circuits 232, 236, and 240 may be internal settings of the modulator 230, the DPMZM 238, and the laser 202, or may have any other suitable configurations.

FIG. 4 illustrates an example method 400 that may be implemented at the apparatus 200 described above to generate an optical signal that is un-polarised, in order to mitigate the nonlinear optical impairment (e.g., XPM and/or XPolM) that closely depends on polarization of the generated optical signal. The method 400 includes:

At step 402, a first and second series of optical pulses are generated. In some examples, each optical pulse in the first series of optical pulses has at least one of a power, a pulse shape, or a timing equal to each optical pulse in the second series of optical pulses.

At step 404, the first and second series of optical pulses are received. In the example of FIG. 2B, the first and second optical fibers 206, 208 are physically placed to be orthogonal with respect to each other, in order to cause the first and second SOPs of the respective first and second series of pulses received at the PBC 210 to be orthogonal to each other.

At step 406, the first and second series of optical pulses are combined to output an optical signal that is un-polarized. This step may be implemented at the PBC 210 as shown in FIG. 2A or 2B to generate the un-polarized optical signal. The outputted un-polarized optical signal maybe used to test or characterize an optical fiber in an optical communication network that is under testing, such as the optical communication network 100.

Referring to FIG. 2A again, in some examples, the apparatus 200 may include one or more input/output (I/O) interface(s) 222, which may enable interfacing with one or more appropriate input devices and/or output devices. One or more of the input devices and/or output devices may be included as a component of the apparatus 200 or may be external to the apparatus 200. In some examples, the I/O interface(s) 222 may include a display which presents the time delay and/or the length of the monitored optical fiber that are calculated by the processor 218.

In some applications, the apparatus 200 may include one or more memories 224, which may include a volatile or non-volatile memory (e.g., a flash memory, a random access memory (RAM), and/or a read-only memory (ROM)). The non-transitory memory(ies) 224 may store instructions for execution by the processor 218, such as to carry out the present disclosure. The memory(ies) 224 may include other software instructions, such as for implementing an operating system and other applications/functions. In some examples, one or more data sets and/or module(s) may be provided by an external memory (e.g., an external drive in wired or wireless communication with the apparatus 200 or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 226 providing communication among components of the apparatus 200, including the processor 218, I/O interface(s) 222, and memory(ies) 224. The bus 226 may be any suitable bus architecture including, for example, a memory bus, a peripheral bus or a video bus.

In the present disclosure, an example optical apparatus is described. An un-polarized optical signal is generated by the optical apparatus by combining a first and second series of optical pulses having mutually orthogonal polarizations. As the first SOP of the first series of optical pulses and the second SOP of the second series of optical pulses are polarized orthogonally with respect to each other, the generated optical signal with dual polarizations (e.g., including the first and second orthogonal SOPs) behaves like an un-polarised signal.

In some examples, in order to prevent frequencies of the first and second series of optical pulses from being too close and causing beating, the frequencies of the first and second series of optical pulses have at least one frequency offset with respect to each other.

In some applications, for at least one of the first and second series of optical pulses, a rising slope time on a rising edge and/or a falling slope time on a falling edge of each optical pulse may be controlled to be greater than zero, which may help to reduce tracking errors for recovering a payload-carrying optical signal that is being carried on the monitored optical fiber.

The example disclosed optical apparatus may be implemented as an OTDR, which may help to improve performance and reliability (e.g., accuracy, measurement range, and instrument resolution) of the OTDR that is used to characterize or trouble shoot a monitored fiber or an optical communication network that is under test.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an onboard processor, a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An apparatus in an optical network, comprising:
at least a first and a second laser, the first laser configured to generate a first series of optical pulses, and the second laser configured to generate a second series of optical pulses; and
a polarization beam combiner (PBC) configured to receive the first and second series of optical pulses, each optical pulse in the first series of optical pulses being received with a first state of polarization (SOP), and each optical pulse in the second series of optical pulses being received with a second SOP, the first SOP and second SOP being orthogonal with respect to each other, the PBC being further configured to combine the first and second series of optical pulses and to output an un-polarized optical signal;

wherein each optical pulse in at least one of the first and second series of optical pulses has a respective rising edge and a respective falling edge, the first laser being configured to, for the optical pulse in the first series of optical pulses, adjust at least one of a rising slope time on the respective rising edge or a falling slope time on the respective falling edge to be greater than zero; and the second laser being configured to, for the optical pulse in the second series of optical pulses, adjust at least one of a rising slope time on the respective rising edge or a falling slope time on the respective falling edge to be greater than zero.

2. The apparatus of claim 1, wherein a first frequency of the first series of optical pulses generated from the first laser has a frequency offset relative to a second frequency of the second series of optical pulses generated from the second laser.

3. The apparatus of claim 1, wherein the apparatus further comprises:

at least a first and a second optical fiber, the first optical fiber coupling the first laser to the PBC, and the second optical fiber coupling the second laser to the PBC, wherein the first optical fiber is disposed such that first optical fiber has a first orientation that is physically rotated 90° with respect to a second orientation of the second optical fiber, such that the first SOP of each of the first series of optical pulses received at the PBC is orthogonal to the second SOP of each of the second series of optical pulses received at the PBC.

4. The apparatus of claim 1, wherein each optical pulse in the first series of optical pulses has at least one of a power, a pulse shape, or a timing equal to each optical pulse in the second series of optical pulses.

5. The apparatus of claim 1, the apparatus further comprising:

an optical circulator configured to transmit the un-polarized optical signal into a monitored optical fiber.

6. The apparatus of claim 5, the apparatus further comprising:

a photodetector (PD) configured to receive a reflected signal that is scattered back along the monitored optical fiber and to measure a power and a time delay of the reflected signal.

7. The apparatus of claim 1, wherein the apparatus includes an optical time-domain reflectometer (OTDR).

8. The apparatus of claim 1, wherein each of the first and second SOPs includes a linear polarization.

9. A method for generating an optical signal in an optical network, the method comprising:

receiving a first series of optical pulses and a second series of optical pulses, each optical pulse in the first series of optical pulses being received with a first state of polarization (SOP), and each optical pulse in the second series of optical pulses being received with a second SOP, the first SOP and the second SOP being orthogonal with respect to each other, each optical pulse in at least one of the first and second series of optical pulses having a respective rising edge and a respective falling edge;

adjusting at least one of a rising slope time on the respective rising edge or a falling slope time on the respective falling edge to be greater than zero; and combining the first and second series of optical pulses to output the optical signal that is un-polarized.

10. The method of claim 9, wherein a first frequency of the first series of optical pulses has a frequency offset relative to a second frequency of the second series of optical pulses.

11. The method of claim 9, wherein the first series of optical pulses are carried on a first optical fiber that is disposed such that the first optical fiber has a first orientation that is physically rotated 90° with respect to a second orientation of a second optical fiber, such that the first SOP of each of the first series of optical pulses is orthogonal to the second SOP of each of the second series of optical that are carried on the second optical fiber.

12. The method of claim 11, the method further comprising:

receiving a reflected signal that is scattered back along the monitored optical fiber; and measuring a power and a time delay of the reflected signal.

13. The method of claim 9, wherein each optical pulse in the first series of optical pulses has at least one of a power, a pulse shape, or a timing equal to each optical pulse in the second series of optical pulses.

14. The method of claim 9, the method further comprising:

transmitting the optical signal into a monitored optical fiber.

15. The method of claim 9, wherein each of the first and second SOPs includes a linear polarization.

16. The method of claim 9, wherein the method is implemented on an optical time-domain reflectometer (OTDR).

* * * * *